United States Patent [19]

Byram et al.

[11] 4,194,636
[45] Mar. 25, 1980

[54] BRACKET ASSEMBLY

[75] Inventors: David C. Byram, River Falls, Wis.; John V. Nowicki, Jr., St. Paul, Minn.

[73] Assignee: Minnesota Mining and Manufacturing Company, St. Paul, Minn.

[21] Appl. No.: 896,581

[22] Filed: Apr. 14, 1978

[51] Int. Cl.² ........................................... A47F 5/08
[52] U.S. Cl. ........................................... 211/71; 211/94
[58] Field of Search ............... 211/71, 40, 94, 162, 211/88, 13; 206/387, 398; 248/214, 215

[56] References Cited

U.S. PATENT DOCUMENTS

| 2,960,940 | 11/1960 | Schreyer | 211/162 X |
| 3,189,187 | 6/1965 | Guyer, Jr. et al. | 211/71 |
| 3,323,847 | 6/1967 | Clouthier | 211/40 X |
| 4,085,867 | 4/1978 | Heller | 248/215 X |
| 4,094,415 | 6/1978 | Larson | 211/94 X |

FOREIGN PATENT DOCUMENTS

| 1062904 | 8/1959 | Fed. Rep. of Germany | 211/71 |
| 2444415 | 3/1976 | Fed. Rep. of Germany | 211/94 |

Primary Examiner—William H. Schultz
Assistant Examiner—Robert W. Gibson, Jr.
Attorney, Agent, or Firm—Curzan Alexander; Donald M. Sell; William L. Huebsch

[57] ABSTRACT

A wall mounted bracket assembly adapted to serve as a hanger for a plurality of video cassette storage and shipping boxes and/or video cassettes. The bracket assembly includes a channel including a lip over which a hook portion on each of the storage and shipping boxes may be engaged; and a cassette adapter which may be releasably engaged with the channel and has a finger portion adapted to engage an opening in a video cassette to hang the video cassette from the bracket assembly.

6 Claims, 5 Drawing Figures

BRACKET ASSEMBLY

BACKGROUND OF THE INVENTION

This invention relates to means for storing video cassettes and video cassette storage and shipping boxes.

Heretofore, the only known provision made for the orderly storage of video cassettes and most storage and shipping boxes for video cassettes has been to provide rectangular peripheries for the video cassettes or boxes which afford stacking them in side by side relationship. One exception is the storage and shipping box for video cassettes described in a U.S. Patent Application being filed concurrently herewith, assigned to the assignee of this aplication, filed as Ser. No. 896,586, 4/14/78; now U.S. Pat. No. 4,177,896. That application (the content whereof is incorporated herein by reference) teaches and claims a rectangular plastic storage and shipping box for video cassettes which was known to applicants before the invention described herein was made. That storage and shipping box includes a hook portion projecting over a recess in the box. The hook portion of the box may be engaged over a horizontal member passing through the recess, and the storage and shipping box further includes a handle portion on its edge opposite the hook portion that is stored flush with the outer surface of the box, but can be swung out and manually engaged to facilitate hanging the box on or removing the box from a horizontal member.

SUMMARY OF THE INVENTION

The present invention complements the storage and shipping box with the novel hook portion described above in that it provides a bracket assembly over which the hook portions of a pluralily of the storage and shipping boxes may be engaged to hang the boxes in side by side relationship; and additionally provides means by which video cassettes themselves may be hung in side by side relationship with themselves or the storage and shipping boxes along the bracket assembly.

The bracket assembly according to the present invention comprises an elongate channel including a back portion adapted to be attached to a wall in a horizontal position and a hanger portion projecting away from the back portion. The hanger portion has a lip along its outer edge which projects upwardly when the channel is attached to the wall, and is sized so that the hook portions on one or more of the storage and shipping boxes may be engaged over the lip to hang the boxes.

The bracket assembly also includes a cassette adapter which is releasably engageable with the channel and comprises a projecting finger portion which is shaped to enter an opening and engage inside an edge wall in a video cassette to hang the video cassette from the bracket assembly.

Preferably the cassette adapter also includes spaced guide portions projecting parallel to, past and on opposite sides of the finger portion. The guide portions locate a cassette being hung transversely with respect to the finger portion and can guide the cassette so that its edge wall can be moved along the end of the finger portion until the opening moves adjacent the finger portion to receive it.

Also, preferably the means for releasably engaging the cassette adapter on the channel mounts the cassette adapter for sliding movement along the channel to facilitate changing the position of hanging cassettes along the bracket assembly as may be desired to change their order or to move them into or out of a close spaced relationship.

BRIEF DESCRIPTION OF THE DRAWING

The present invention will be more thoroughly explained with reference to the accompanying drawing wherein like numbers refer to like parts in the several views, and wherein.

DESCRIPTION OF THE PREFERRED EMBODIMENT

Figure 1:
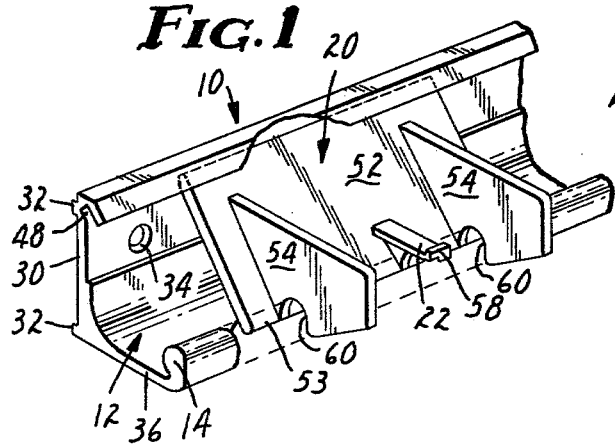
FIG. 1 is a fragmentary perspective view of a bracket assembly according to the present invention having parts broken away to show details.

Referring now to the drawing there is shown a bracket assembly according to the present invention generally designated by the reference numeral 10.

Figure 4:
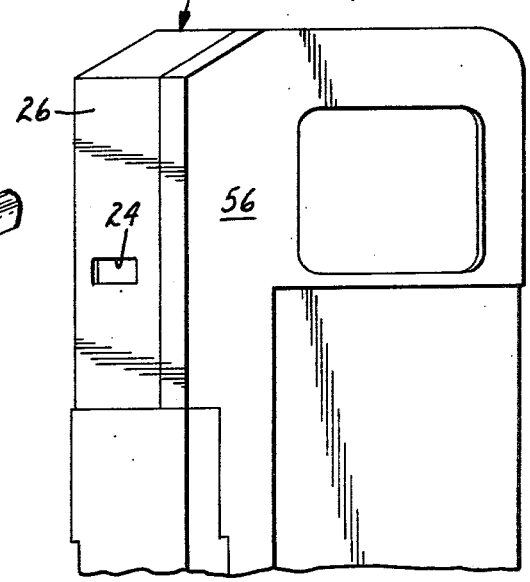
FIG. 4 is a fragmentary perspective view of a video cassette.
Figure 2:
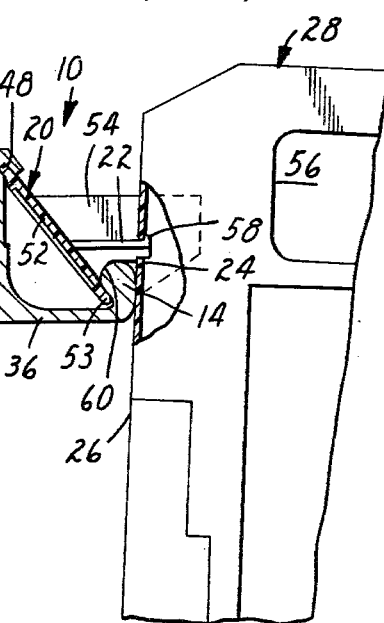
FIG. 2 is a fragmentary perspective view of a shipping and storage box for a video cassette showing a hook portion of the box.
Figure 5:
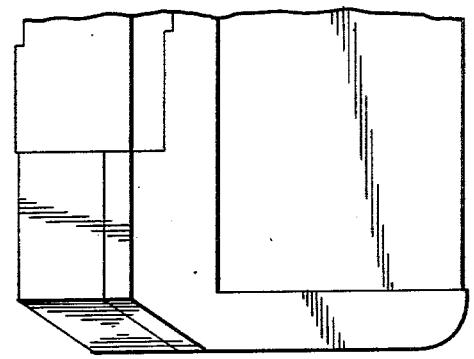
FIG. 5 is a sectional view of the bracket assembly shown in FIG. 1 and shown with a finger portion of a cassette adapter engaged in an opening in the video cassette to hang the video cassette from the bracket assembly.
Figure 5:
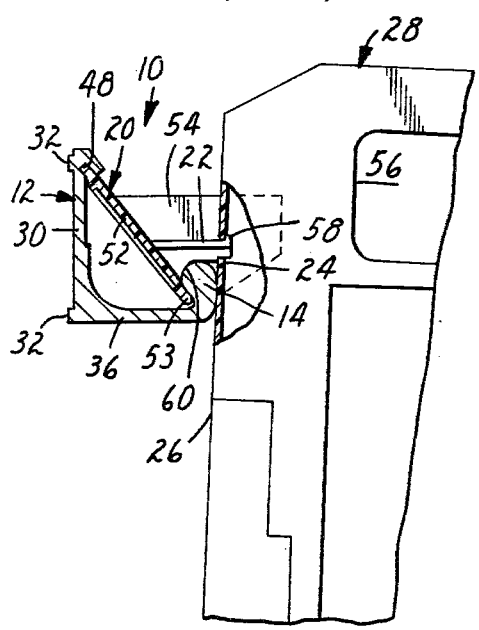
Figure 3:
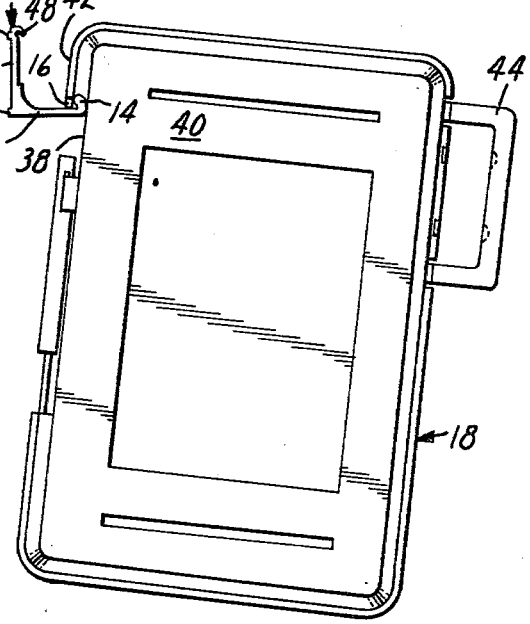
FIG. 3 is a reduced vertical side view of a channel included in the bracket assembly of FIG. 1 showing the hook portion of the box of FIG. 2 engaged over it to hang the box.

The bracket assembly 10 comprises an elongate channel 12 having a lip 14 over which may be engaged a hook portion 16 of a shipping and storage box 18 (FIG. 2) to afford hanging the box 18 for storage as is illustrated in FIG. 3; and a cassette adapter 20 which is releasably engageable with the channel 12 and includes a finger portion 22 which may be engaged through an opening 24 in an edge wall 26 of a video cassette 28 (FIG. 4) to hang the video cassette 28 from the bracket assembly 10 as is illustrated in FIG. 5.

The elongate channel 12 is an extrusion, as of aluminum, which may be of any length desired to accommodate a number of the storage boxes 18 and/or a number of the video cassettes 28 through the use of the same number of the cassette adapters 20. The channel 12 includes a back portion 30 having a plate-like part including spaced elongate rails 32 extending longitudinally of the channel 12. The rails 32 provide a contact surface that will contact a vertical surface (such as the vertical surface of a wall) against which the channel 12 is attached in a horizontal altitude as by screws through spaced openings 34 along the channel 12. The channel 12 also includes a hanger portion 36 having a plate-like part projecting from one edge of the plate-like part of the back portion 30 at generally a right angle with respect to its contact surface, and supporting the lip 14 along its distal edge. The lip 14 projects on the same side of the plate-like part of the hanger portion 36 as the back portion 30, and has a generally circular cross section which provides an arcuate upper surface that affords smooth engagement and disengagement of the hooklike portion 16 of the shipping and storage box 18.

A plurality of the boxes 18 may be hung in side by side relationship by engaging their hook portions 16 over the lip 14 of the channel 12. With the hook portion 16 of each box so engaged, the lip 14 will extend through a recess 38 in the box 18 which recess 38 opens through the side walls 40 and an edge wall 42 of the box. As is explained in more detail in the application on the box 18 referred to in the introduction to this specification, the box 18 also includes a handle portion 44 which may be moved to the position shown in FIG. 3 and manually engaged to engage the hook portion 16 with, or disengage the hook portion 16 from the lip 14. The handle portion 44 is particularly convenient to hang or remove one box 18 between adjacent boxes.

The channel 12 also includes a part along the edge of the back portion 30 opposite the projecting portion which has a groove 48 extending longitudinally of the channel 12. An edge part of the cassette adapter 20 may be slidably engaged with the groove 48 as illustrated in FIG. 1 to provide part of means for releasably engaging the cassette adapter 20 on the channel 12 and for affording sliding movement of the cassette adapter longitudinally of the channel 12 as will later be explained.

The cassette adapter 20 which allows the cassettes 28 to be hung from the bracket assembly 10 may be molded of a stiff polymeric material. The cassette adapter 20 includes a rectangular plate-like portion 52 including the edge part adapted to engage the groove 48 and an opposite edge part 53 adapted to engage the inner side of the lip 14. Also included are two spaced guide portions 54 projecting from the plate-like portion 52 on opposite sides of, parallel to, and past the finger portion 22. The guide portions 54 have opposed parallel flat surfaces adapted to extend in closely spaced relationship along planar side walls 56 of the cassette and locate the cassette 28 transversely with respect to the finger portions 22 so that the cassette can be moved longitudinally between the guide portions 54 with the edge wall 26 of the cassette 28 pressed against the distal end of the finger portion 22 until the opening 24 moves adjacent the finger portion, allowing the edge wall 26 to move over the finger portion 22. The finger portion 22 has a lip 58 at its distal end which can then engage behind the edge wall 26 and retain the cassette 28 in engagement with the finger portion 22 under the influence of its own weight (FIG. 5).

Each of the guide portions 54 has an arcuate notch 60 adjacent the edge part 53 of the plate-like portion 52. The edges of the guide portions 54 defining the notches 60 and the edge part 53 slidably engage around the llp 14, and together with the edge part of the plate-like portion which slidably engages the groove 48 in the channel 12 provides the means for both releasably engaging the cassette adapter 20 on the channel 12 and for affording sliding movement of the cassette adapter longitudinally of the channel 12. To engage or disengage the cassette adapter 20 with the channel 12, a user may slip the adapter into or out of an end of the channel 12; and once the cassette adapter is engaged with the channel 12 it may be slid along its length to position it or a cassette engaged with it in a desired position.

We claim:

1. A bracket assembly adapted to serve as a hanger for a plurality of storage and shipping boxes for video cassettes each having a hook portion projecting over a recess in its walls, and a plurality of video cassettes each having an opening along one edge wall at a predetermined position between its side walls, said bracket assembly comprising an elongate channel including:
   a back portion having a contact surface; and
   a hanger portion projecting from said back portion away from said contact surface and having a distal lip projecting in a generally parallel with said contact surface, said hanger portion and lip being sized so that with said back portion attached to a vertical surface, said channel horizontal, said contact surface adjacent said vertical surface and said lip projecting upwardly the hook portion on a said box may be engaged over the lip to hang the box with the hanger portion extending through the recess in the box;

a cassette adapter comprising:
   a projecting finger portion having a ledge at its distal end, and being shaped to enter the opening in a said cassette and engage said ledge behind the edge wall of the cassette; and guide means adapted to engage a side wall of a said cassette being hung on said projecting finger portion to position the cassette in the proper transverse alignment for engagement of said finger portion in the opening in the cassette; and means adapted for releasably engaging said cassette adapter with said channel to position said finger portion along said hanger portion and projecting generally away from said contact surface so that with said channel horizontal and attached to a vertical surface as described above, said finger portion can be engaged through the opening in a cassette to hang it from the bracket assembly.

2. A bracket assembly according to claim 1 wherein said guide means includes spaced planar portions projecting parallel to, past, and on opposite sides of said finger portion.

3. A bracket assembly according to claim 1 or claim 2 wherein said means adapted for releasably engaging said cassette adapter with said channel mounts said adapter on said channel for sliding movement longitudinally of said channel.

4. A bracket assembly according to claim 3 wherein said means for releasably engaging said cassette adapter with said channel comprises a part of said back portion having a groove extending longitudinal of said channel, an edge part of said cassette adapter adapted to engage and slide along said groove, and portions of said cassette adapter shaped for engagement over said lip to afford sliding motion of said cassette adapter along said lip and retain said edge part in engagement with said groove.

5. A bracket assembly according to claim 1 or claim 2 wherein said back portion includes a plate-like part defining said contact surface, said hanger portion includes a plate-like part projecting from one edge of the plate-like part of said back portion at generally a right angle with respect to said contact surface, and said lip is on the same side of the plate-like part of said hanger portion as said b ick portion.

6. A bracket assembly according to claim 5 wherein said lip has an arcuate surface opposite the plate-like part of said hanger portion.

* * * * *